United States Patent
Goto et al.

(10) Patent No.: US 8,072,696 B2
(45) Date of Patent: Dec. 6, 2011

(54) WIDE ANGLE OPTICAL SYSTEM AND IMAGE PICKUP APPARATUS USING THE SAME

(75) Inventors: Hisashi Goto, Tokyo-to (JP); Akio Michinaka, Hachioji (JP); Takahiro Amanai, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/590,238

(22) Filed: Nov. 3, 2009

(65) Prior Publication Data
US 2010/0157443 A1 Jun. 24, 2010

(30) Foreign Application Priority Data
Nov. 10, 2008 (JP) .................................. 2008-288142

(51) Int. Cl.
*G02B 9/12* (2006.01)
*G02B 13/18* (2006.01)
*G02B 3/02* (2006.01)
(52) U.S. Cl. ........................................ 359/791; 359/716
(58) Field of Classification Search .................. 359/716, 359/753, 784, 785, 791
See application file for complete search history.

(56) References Cited

U.S. PATENT DOCUMENTS

| 7,466,911 | B2 | 12/2008 | Isono |
| 2004/0150893 | A1* | 8/2004 | Shinohara ..................... 359/785 |

FOREIGN PATENT DOCUMENTS

| JP | 2007-047513 | 2/2007 |
| JP | 2007-058153 | 3/2007 |

* cited by examiner

*Primary Examiner* — Alicia M Harrington
(74) *Attorney, Agent, or Firm* — Kenyon & Kenyon LLP

(57) ABSTRACT

A wide angle optical system is formed by, in order from the object side, an aperture stop, a first lens with positive refracting power, a second lens with negative refracting power, and a third lens. Both surfaces of the third lens are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference, and the following conditions (1) and (2) are satisfied:

$$0.1 < d_5/d_6 < 0.65 \quad (1)$$

$$-0.04 < f/f_3 < 0.04 \quad (2)$$

where $d_5$ is a space distance between the second and third lenses on the optical axis, $d_6$ is the thickness of the third lens on the optical axis, f is a focal length of the whole of the wide optical system, and $f_3$ is a focal length of the third lens.

13 Claims, 8 Drawing Sheets

FIG.2
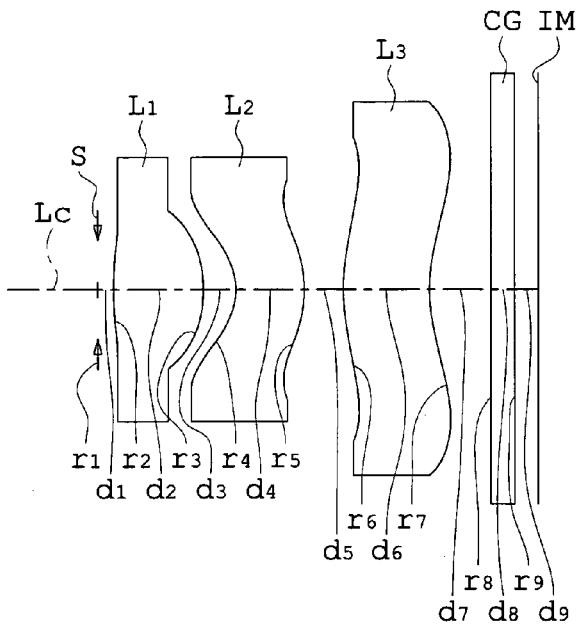
FIG.3A  FIG.3B  FIG.3C  FIG.3D
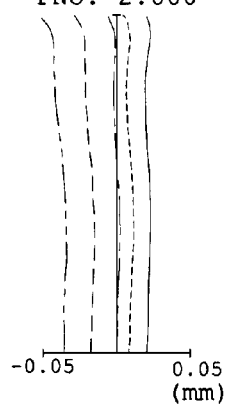
SPHERICAL
ABERRATION
FNO. 2.800
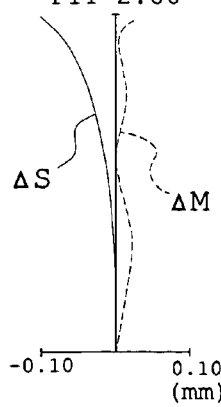
ASTIGMATISM
FIY 2.80
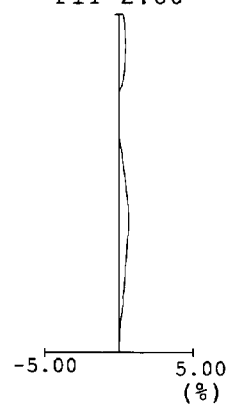
DISTORTION
FIY 2.80
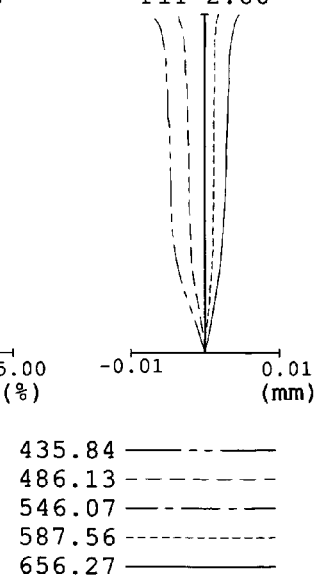
CHROMATIC
ABERRATION OF
MAGNIFICATION
FIY 2.80
435.84
486.13
546.07
587.56
656.27

WIDE ANGLE OPTICAL SYSTEM AND IMAGE PICKUP APPARATUS USING THE SAME

This application claims benefits of Japanese Patent Application No. 2008-288142 filed in Japan on Nov. 10, 2008, the contents of which are hereby incorporated by reference.

BACKGROUND OF THE INVENTION

1. Field of the Invention

This invention relates to a wide angle optical system and an image pickup apparatus using the same. Especially, this invention relates to a small wide angle optical system which is favorable for photographing an object which is located at a relatively close position and relates to an image pickup apparatus using the same.

2. Description of the Related Art

As cellular phones, mobile terminals, and notebook computers have become thinner recently, the thin apparatuses require a camera module which is thinned in the direction of the length along the optical axis of the optical system to the utmost limit.

In order to meet the requirement, a large number of single-focus optical systems which are composed of about two or three aspherical lenses have been proposed for the purpose of using the single-focus optical systems for a camera module.

There is also a proposal to use for a camera module an image pickup element which has been developed in recent years and the sensitivity of which is not deteriorated by light which is slantingly incident on the periphery of the image pickup element. The use of such image pickup element for a camera module makes it possible to bring an exit pupil position of an optical system near to the image pickup element, so that it is possible to shorten the total length of the optical system by the use of the image pickup element. As a result, it is possible to thin the camera module. This is the reason why the use of such image pickup element for a camera module has been proposed.

Japanese Patent Kokai No. 2007-3768, Japanese Patent Kokai No. 2007-47513, and Japanese Patent Kokai No. 2007-58153 disclose an optical system which is composed of three lenses and in which an exit pupil position is nearer to an image pickup element, as one example of such optical systems. The optical system which is disclosed in the patent literatures is made as a telephoto type optical system in which a positive lens, a negative lens, and a negative lens are arranged in order from the object side of the optical system, with the aim of shortening the total length of the optical system more.

SUMMARY OF THE INVENTION

A wide angle optical system according to the present invention is characterized in that: the wide angle optical system comprises, in order from the object side, an aperture stop, a first lens with positive refracting power, a second lens with negative refracting power, and a third lens; both surfaces of the third lens are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference of the lens; and the following conditions (1) and (2) are satisfied:

$$0.1 < d_5/d_6 < 0.65 \quad (1)$$

$$-0.04 < f/f_3 < 0.04 \quad (2)$$

where $d_5$ is a space distance between the second and third lenses on the optical axis, $d_6$ is the thickness of the third lens on the optical axis, f is a focal length of the whole of the wide angle optical system, and $f_3$ is a focal length of the third lens.

Also, a wide angle optical system according to the present invention preferably satisfies the following condition (3):

$$0.30 < h_{m7}/h_{P7} < 2.0 \quad (3)$$

where $h_{m7}$ is the shortest distance between the optical axis and a point on the image-side surface of the third lens through which a light ray passing through the center of the aperture stop at an angle of 36 degrees to the optical axis to be used for an image formation passes, and $h_{P7}$ is the shortest distance between the optical axis and the most image-side point on the image-side surface of the third lens.

Also, a wide angle optical system according to the present invention preferably satisfies the following condition (4):

$$0.06 < d_{P7}/f < 0.3 \quad (4)$$

where $d_{P7}$ is the distance between: a point at which the image-side surface of the third lens and the optical axis cross each other; and a point on the optical axis at which the distance between the most image-side point on the image-side surface of the third lens and the optical axis becomes the shortest distance.

Also, a wide angle optical system according to the present invention preferably satisfies the following condition (5):

$$10 < v_2 < 25 \quad (5)$$

where $v_2$ is the Abbe's number of the second lens.

Also, a wide angle optical system according to the present invention preferably satisfies the following condition (6):

$$0.9 < r_2/r_3 < 4.4 \quad (6)$$

where $r_2$ is the radius of curvature of the image-side surface of the first lens, and $r_3$ is the radius of curvature of the object-side surface of the second lens.

Also, a wide angle optical system according to the present invention preferably satisfies the following condition (7):

$$0.3 < |Hr/\Sigma d| < 1.4 \quad (7)$$

where Hr is the distance from an image formation position to a position of a rear principal point of the whole of the wide angle optical system, and $\Sigma d$ is the total length of the whole of the wide angle optical system.

Also, a wide angle optical system according to the present invention preferably satisfies the following condition (8):

$$-2.0 < Exp/f < -0.45 \quad (8)$$

where Exp is the distance from an image formation position to an exit pupil position.

Also, a wide angle optical system according to the present invention preferably satisfies the following condition (9):

$$0.1 < L3d/Fno_{Min} < 0.7 \quad (9)$$

where L3d is the distance from the object-side surface of the third lens to an image formation position and the millimeter (mm) is used as the unit of L3d, and $Fno_{Min}$ is the minimum F-number.

Also, a wide angle optical system according to the present invention preferably satisfies the following condition (10):

$$25\% < ILL < 45\% \quad (10)$$

where ILL is quantity of light of off-axis light flux to quantity of light of on-axis light flux at an image formation position.

Also, a wide angle optical system according to the present invention preferably satisfies the following condition (11):

$$0.07 < (r_1 + r_2)/(r_1 - r_2) < 0.8 \quad (11)$$

where $r_1$ is the radius of curvature of the object-side surface of the first lens, and $r_2$ is the radius of curvature of the image-side surface of the first lens.

An image pickup apparatus according to the present invention is characterized in that the image pickup apparatus comprises any one of the above-described wide angle optical systems and an image pickup element which is arranged on the image side of the wide angle optical system and transforms an optical image into electrical signals.

BRIEF DESCRIPTION OF THE DRAWINGS

FIG. 2 is a sectional view showing the formation of an image pickup apparatus provided with a wide angle optical system according to the first embodiment, taken along the optical axis.

FIGS. 3A, 3B, 3C, and 3D are diagrams showing spherical aberration, astigmatism, distortion, and chromatic aberration of magnification of the wide angle optical system shown in FIG. 2 respectively.

DETAILED DESCRIPTION OF THE PREFERRED EMBODIMENTS

Figure 1:
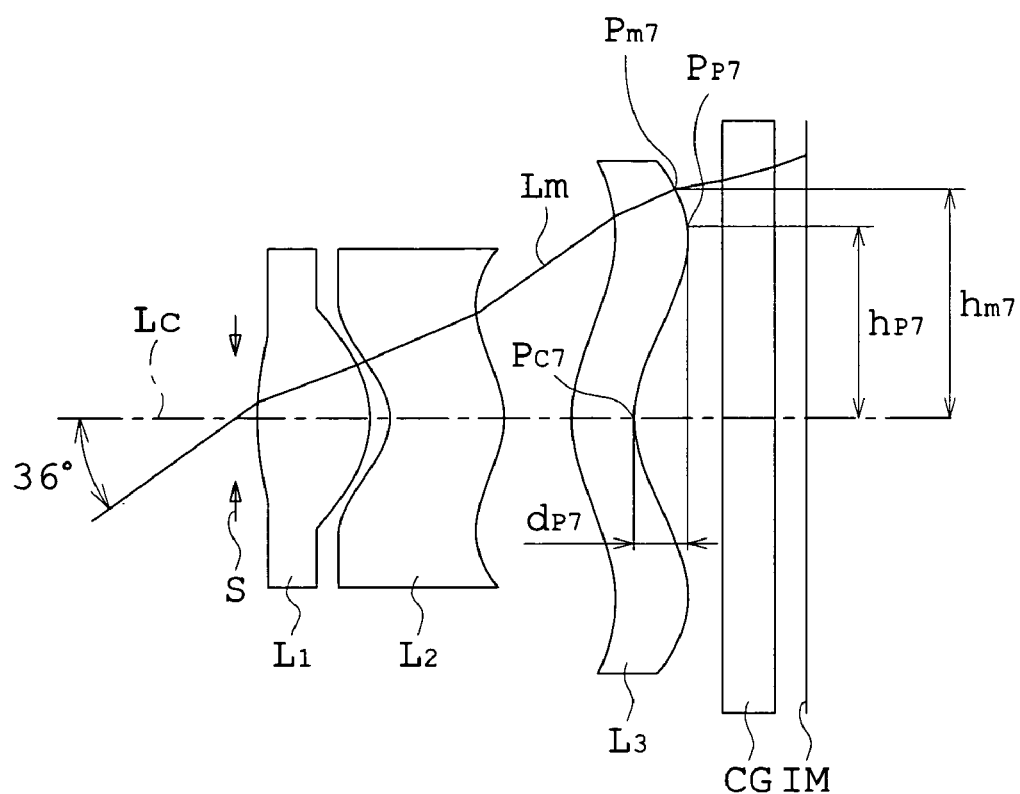
FIG. 1 is a schematic view showing an image pickup apparatus according to the present invention and showing parameters which are involved in the conditions (3) and (4).

Before undertaking the description of the embodiments of a wide angle optical system of the present invention and an image pickup apparatus using the same, the operation and effects by the constitutions of the present invention will be explained. In the present invention, a lens the paraxial focal length of which has a positive value is treated as a positive lens, and a lens the paraxial focal length of which has a negative value is treated as a negative lens.

A wide angle optical system of the present invention comprises, in order from the object side, an aperture stop, a first lens with positive refracting power, a second lens with negative refracting power, and a third lens.

When a telephoto type optical system becomes wide angle, the incident angle of an off-axis principal ray incident on the image pickup surface of an image pickup element arranged on the image side of the telephoto type optical system will become larger. As a result, the sensitivity of the image pickup element deteriorates on the periphery of the image pickup element. However, when an aperture stop is arranged at the object side than every lens as in the wide angle optical system of the present invention, the exit pupil can be kept apart from the image surface, so that it is possible to decrease the angle of incidence of light ray which is incident on the periphery of the image pickup element. As a result, it is possible to avoid the deterioration of sensitivity on the periphery of the image pickup element.

A wide angle optical system according to the present invention is formed so as to satisfy the following condition (1):

$$0.1 < d_5/d_6 < 0.65 \qquad (1)$$

where $d_5$ is a space distance between the second and third lenses on the optical axis, and $d_6$ is the thickness of the third lens on the optical axis.

The condition (1) is used for prescribing the position of the object-side surface of the third lens. If $d_5/d_6$ is below the lower limit value of the condition (1), the object-side surface of the third lens becomes too near to the image-side surface of the second lens, so that an separation of light flux in the direction of an image height becomes inadequate. As a result, it is difficult to correct an aberration. Especially, when an angle of view is large, it is difficult to correct astigmatism and field curvature. On the other hand, if $d_5/d_6$ is beyond the upper limit value of the condition (1), it is difficult to correct an aberration in the object-side surface of the third lens. Especially, when an angle of view is large, it is difficult to correct a coma.

A wide angle optical system according to the present invention is more preferably formed to satisfy the following condition (1)' instead of the condition (1):

$$0.15 < d_5/d_6 < 0.55 \qquad (1)'$$

A wide angle optical system according to the present invention is formed in such a way that: both surfaces of the third lens are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference of the lens; and the following condition (2) is satisfied:

$$-0.04 < f/f_3 < 0.04 \qquad (2)$$

where f is a focal length of the whole of the wide angle optical system and $f_3$ is a focal length of the third lens.

The above-described shapes of both surfaces of the third lens and the condition (2) satisfied by the wide angle optical system make it possible to put the principal point at a position on the object side of the optical system without negating the effect of the second lens with negative refracting power. As a result, it is possible to sufficiently shorten the total length of the optical system to the focal length.

If $f/f_3$ is below the lower limit value of the condition (2), the third lens having a high dispersion characteristic has too large refracting power in the central portion of the third lens, so that an axial chromatic aberration remarkably occurs and makes the image quality deteriorate. On the other hand, if $f/f_3$ is beyond the upper limit value of the condition (2), the refracting power in the central portion of the third lens becomes too small and the diverging action also becomes weak, so that the position of the principal point shifts to the image side. As a result, the optical system becomes large.

If a wide angle optical system according to the present invention is formed to satisfy the following condition (2)' instead of the condition (2), the difference between on-axis refracting power and off-axis refracting power of the third lens is easily made, so that it is easily possible to downsize the optical system more, and a distortion is easy to correct:

$$-0.035 < f/f_3 < 0.025 \qquad (2)'$$

In this case, the upper limit value of the condition (2)' may be replaced with the upper limit value of the condition (2), or the lower limit value of the condition (2)' may be replaced with the lower limit value of the condition (2).

A wide angle optical system according to the present invention is preferably formed in such a way that the parameters shown in FIG. 1 satisfy the following condition (3):

$$0.30 < h_{m7}/h_{P7} < 2.0 \qquad (3)$$

where $h_{m7}$ is the shortest distance between the optical axis and a point on the image-side surface of the third lens through which a light ray passing through the center of the aperture stop S at an angle of 36 degrees to the optical axis to be used for an image formation passes, and $h_{P7}$ is the shortest distance between the optical axis and the most image-side point on the image-side surface of the third lens.

FIG. 1 is a schematic view showing an image pickup apparatus which comprises a wide angle optical system according to the present invention, a cover glass, and an image pickup element such as a CCD (Charge Coupled Device) and a CMOS (Complementary Metal-Oxide Semiconductor). In addition, FIG. 1 also shows the parameters which are involved in the conditions (3) and (4) respectively.

In FIG. 1, S is the aperture stop, $L_1$ is the first lens, $L_2$ is the second lens, $L_3$ is the third lens, CG is the cover glass, IM is the image pickup surface of the image pickup element, $L_c$ is the optical axis, $L_m$ is the light ray which passes through the center of the aperture stop S at an angle of 36 degrees to the optical axis $L_c$ to form an image on the image pickup surface IM, $P_{C7}$ is the point at which the image-side surface of the third lens $L_3$ and the optical axis $L_c$ cross each other, $P_{m7}$ is the point on the image-side surface of the third lens $L_3$ through which the light ray $L_m$ passes, $P_{P7}$ is the most image-side point on the image-side surface of the third lens $L_3$, $h_{m7}$ is the shortest distance from the point $P_{m7}$ to the optical axis $L_c$, $h_{P7}$ is the shortest distance from the point $P_{P7}$ to the optical axis $L_c$, and $d_{P7}$ is the distance between: the point on the optical axis $L_c$ at which the distance from the point $P_{P7}$ to the optical axis $L_c$ becomes the shortest distance; and the point $P_{C7}$.

When the wide angle optical system according to the present invention in which both surfaces of the third lens have a concave shape facing toward the object side in the vicinity of the outer circumference of the lens is formed in such a way that the wide angle optical system satisfies the condition (3), such formation of the wide angle optical system satisfying the condition (3) can make a small angle of incidence of an off-axis principal ray which is incident on the periphery of the image pickup element in the case of an arrangement of the image pickup element on the image side of the optical system. As a result, it is possible to avoid the deterioration of sensitivity of the image pickup element on the periphery of the image pickup element. In addition, such formation also makes it possible to correct a pincushion distortion occurring with the second lens.

If $h_{m7}/h_{P7}$ is below the lower limit value of the condition (3), the third lens having a high dispersion characteristic has too large refracting power in the central portion of the third lens, so that an axial chromatic aberration remarkably occurs and makes the image quality deteriorate. On the other hand, if $h_{m7}/h_{P7}$ is beyond the upper limit value of the condition (3), the convergence action of the third lens in the vicinity of the outer circumference of the third lens becomes too weak, so that an angle of incidence of an off-axis principal ray which is incident on the periphery of the image pickup element becomes large. As a result, it is impossible to sufficiently avoid the deterioration of sensitivity of the image pickup element on the periphery of the image pickup element.

A wide angle optical system according to the present invention is more preferably formed to satisfy the following condition (3)' instead of the condition (3):

$$0.50 < h_{m7}/h_{P7} < 1.24 \qquad (3)'$$

In this case, the upper limit value of the condition (3)' may be replaced with the upper limit value of the condition (3), or the lower limit value of the condition (3)' may be replaced with the lower limit value of the condition (3).

A wide angle optical system according to the present invention is preferably formed in such a way that the parameters shown in FIG. 1 satisfy the following condition (4):

$$0.06 < d_{P7}/f < 0.3 \qquad (4)$$

where $d_{P7}$ is the distance between: a point at which the image-side surface of the third lens and the optical axis cross each other; and a point on the optical axis at which the distance between the most image-side point on the image-side surface of the third lens and the optical axis becomes the shortest distance.

When the wide angle optical system according to the present invention in which both surfaces of the third lens have a concave shape facing toward the object side in the vicinity of the outer circumference of the lens is formed in such a way that the wide angle optical system satisfies the condition (4), such formation of the wide angle optical system satisfying the condition (4) can make a small angle of incidence of an off-axis principal ray which is incident on the periphery of the image pickup element in the case of an arrangement of the image pickup element on the image side of the optical system. As a result, it is possible to avoid the deterioration of sensitivity of the image pickup element on the periphery of the image pickup element. In addition, such formation also makes it possible to correct a distortion.

If $d_{P7}/f$ is below the lower limit value of the condition (4), the third lens of the high dispersion characteristic has too large refracting power in the central portion of the third lens, so that an axial chromatic aberration remarkably occurs and makes the image quality deteriorate. On the other hand, if $d_{P7}/f$ is beyond the upper limit value of the condition (4), the convergence action of the third lens in the vicinity of the outer circumference of the third lens becomes too weak, so that an angle of incidence of an off-axis principal ray which is incident on the periphery of the image pickup element becomes large. As a result, it is impossible to sufficiently avoid the deterioration of sensitivity of the image pickup element on the periphery of the image pickup element. In addition, the parameters which do not satisfy the condition (4) causes too small a difference between actions of the lens on on-axis light flux and off-axis light flux in the image-side surface of the third lens, so that it is impossible to effectively correct a distortion.

A wide angle optical system according to the present invention is more preferably formed to satisfy the following condition (4)' instead of the condition (4):

$$0.09 < d_{P7}/f < 0.19 \quad (4)'$$

In this case, the upper limit value of the condition (4)' may be replaced with the upper limit value of the condition (4), or the lower limit value of the condition (4)' may be replaced with the lower limit value of the condition (4).

A wide angle optical system according to the present invention preferably satisfies the following condition (5):

$$10 < \nu_2 < 25 \quad (5)$$

where $\nu_2$ is the Abbe's number of the second lens.

In order to give a wide angle capability to an optical system like a wide angle optical system according to the present invention, the optical system must be formed in such a way that the focal length of the first lens is small. However, the small focal length of the first lens causes the occurrence of a large chromatic aberration. In a wide angle optical system according to the present invention, both surfaces of the third lens are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference of the lens. That is to say, the image-side surface of the third lens is a surface having inflection points, so that a correction of an axial chromatic aberration in the third lens causes a large chromatic aberration of magnification occurring in the vicinity of the outer circumference of the third lens. Accordingly, a wide angle optical system according to the present invention is preferably formed in such a way that the second lens is made of a material having a high dispersion characteristic in order to correct a chromatic aberration of magnification. In addition, the second lens is preferably given suitable refracting power in order to prevent a coma from increasing. The condition (5) is used for prescribing such second lens.

If $\nu_2$ is below the lower limit value of the condition (5), it is hard to obtain a material which has good optical characteristics, especially good optical characteristics for transmittance and scattering of light on the short-wavelength side. On the other hand, if $\nu_2$ is beyond the upper limit value of the condition (5), it is hard to remove a chromatic aberration of magnification in the second lens when the wide angle optical system according to the present invention satisfies the condition (2), so that it is hard to improve the ability of the third lens in the vicinity of the outer circumference of the third lens.

A wide angle optical system according to the present invention preferably satisfies the following condition (6):

$$0.9 < r_2/r_3 < 4.4 \quad (6)$$

where $r_2$ is the radius of curvature of the image-side surface of the first lens, and $r_3$ is the radius of curvature of the object-side surface of the second lens.

The condition (6) is used for prescribing the condition for making a small air space between the first and second lenses without aggravating an aberration. The formation of a wide angle optical system according to the present invention satisfying the condition (6) makes it possible to closely arrange the first and second lenses, so that the whole of the wide angle optical system is easy to downsize. In addition, because the formation satisfying the condition (6) makes it possible to make a small air space between the first and second lenses, the condition (6) makes it possible to ensure a distance from the object-side surface of the second lens to the image-side surface of the third lens, so that the wide angle optical system easily satisfies the condition (1).

If $r_2/r_3$ is below the lower limit value of the condition (6), a coma often occurs. On the other hand, if $r_2/r_3$ is beyond the upper limit value of the condition (6), the air space between the first and second lenses must be large, so that the whole of the wide angle optical system is hard to downsize and it is hard for the wide angle optical system to satisfy the condition (1).

A wide angle optical system according to the present invention is more preferably formed to satisfy the following condition (6)' instead of the condition (6):

$$1.2 < r_2/r_3 < 2.8 \quad (6)'$$

In this case, the upper limit value of the condition (6)' may be replaced with the upper limit value of the condition (6), or the lower limit value of the condition (6)' may be replaced with the lower limit value of the condition (6).

A wide angle optical system according to the present invention preferably satisfies the following condition (7):

$$0.3 < |Hr/\Sigma d| < 1.4 \quad (7)$$

where Hr is the distance from an image formation position to a position of a rear principal point of the whole of the wide angle optical system, and $\Sigma d$ is the total length of the whole of the wide angle optical system.

The condition (7) is used for prescribing a condition for making a small total length of the wide angle optical system while holding occurrence of a field curvature in check. If $|Hr/\Sigma d|$ is below the lower limit value of the condition (7), the total length of the wide angle optical system becomes large. On the other hand, if $|Hr/\Sigma d|$ is beyond the upper limit value of the condition (7), the angle of view to the total length of the wide angle optical system becomes too large. As a result, it is hard to hold occurrence of the field curvature in check.

A wide angle optical system according to the present invention is more preferably formed to satisfy the following condition (7)' instead of the condition (7):

$$0.46 < |Hr/\Sigma d| < 0.89 \quad (7)'$$

In this case, the upper limit value of the condition (7)' may be replaced with the upper limit value of the condition (7), or the lower limit value of the condition (7)' may be replaced with the lower limit value of the condition (7).

A wide angle optical system according to the present invention preferably satisfies the following condition (8):

$$-2.0 < Exp/f < -0.45 \quad (8)$$

where Exp is the distance from an image formation position to an exit pupil position.

The condition (8) is used for prescribing a condition for making downsizing of the wide angle optical system compatible with preservation of the peripheral performance. If Exp/f is below the lower limit value of the condition (8), the wide angle optical system requires the exit pupil far from an image formation position, so that the wide angle optical system becomes large. On the other hand, if Exp/f is beyond the upper limit value of the condition (8), an angle of incidence of a light ray which is incident on the periphery of the image pickup element becomes too large in the case of the arrangement of the image pickup element on the image side of the optical system, so that the peripheral performance remarkably deteriorates.

A wide angle optical system according to the present invention is more preferably formed to satisfy the following condition (8)' instead of the condition (8):

$$-1.3 < \text{Exp}/f < -0.58 \quad (8)'$$

In this case, the upper limit value of the condition (8)' may be replaced with the upper limit value of the condition (8), or the lower limit value of the condition (8)' may be replaced with the lower limit value of the condition (8).

A wide angle optical system according to the present invention preferably satisfies the following condition (9):

$$0.1 < L3d/Fno_{Min} < 0.7 \quad (9)$$

where L3d is the distance from the object-side surface of the third lens to an image formation position and the millimeter (mm) is used as the unit of L3d, and $Fno_{Min}$ is the minimum F-number.

If $L3d/Fno_{Min}$ is below the lower limit value of the condition (9), the F-number becomes small or the object-side surface of the third lens becomes close to an image formation position, so that foreign objects in the optical system stand out. On the other hand, if $L3d/Fno_{Min}$ is beyond the upper limit value of the condition (9), the distance from the object-side surface of the third lens to an image formation position becomes long, so that the wide angle optical system becomes large.

A wide angle optical system according to the present invention is more preferably formed to satisfy the following condition (9)' instead of the condition (9):

$$0.18 < L3d/Fno_{Min} < 0.43 \quad (9)'$$

In this case, the upper limit value of the condition (9)' may be replaced with the upper limit value of the condition (9), or the lower limit value of the condition (9)' may be replaced with the lower limit value of the condition (9).

A wide angle optical system according to the present invention preferably satisfies the following condition (10):

$$25\% < ILL < 45\% \quad (10)$$

where ILL is quantity of light of off-axis light flux to quantity of light of on-axis light flux at an image formation position.

When an optical system is formed like a wide angle optical system according to the present invention in such a way that the optical system has, in order from the object side, positive refracting power and negative refracting power, a positive distortion will occur in the optical system. If an image pickup element arranged on the image side of such optical system is displaced along the direction perpendicular to the optical axis so that the image pickup element is not aligned with a lens frame on the optical axis, then a distortion will occur asymmetrically. As a result, quantity of light in the peripheral part becomes asymmetry, so that the asymmetric quantity of light in the peripheral part causes deteriorated image quality. However, the formation of the wide angle optical system satisfying the condition (10) can prevent occurrence of an asymmetric distortion, so that quantity of light in the central part is well-balanced with quantity of light in the peripheral part. As a result, it is possible to prevent image quality from deteriorating.

If ILL is below the lower limit value of the condition (10), the balance of the quantity of light in the peripheral part is lost, so that it is difficult to brighten an image by adjusting the brightness of the image by an electrical correction and asymmetry of the quantity of light in the peripheral part also easily stands out. On the other hand, if ILL is beyond the upper limit value of the condition (10), although the balance of the quantity of light in the peripheral part is improved, a balance between refracting powers of the lenses is lost in the wide angle optical system which is given a wide angle capability. In particular, a balance between refracting powers of the first and second lenses is lost. As a result, the formation of ILL beyond the upper limit value leads to: a coma, field curvature, and astigmatism which easily occur; or the large total length of the optical system.

A wide angle optical system according to the present invention is more preferably formed to satisfy the following condition (10)' instead of the condition (10):

$$25\% < ILL < 42\% \quad (10)'$$

A wide angle optical system according to the present invention preferably satisfies the following condition (11):

$$0.07 < (r_1 + r_2)/(r_1 - r_2) < 0.8 \quad (11)$$

where $r_1$ is the radius of curvature of the object-side surface of the first lens, and $r_2$ is the radius of curvature of the image-side surface of the first lens.

The first lens of the wide angle optical system according to the present invention has the smallest focal length in the wide angle optical system, so that the first lens is most susceptible to an assembly error in making the wide angle optical system. However, the formation of the wide angle optical system satisfying the condition (11) makes it possible to restrain the influence of variations in the quality of products in manufacturing and gives good optical characteristics to the wide angle optical system.

If $(r_1 + r_2)/(r_1 - r_2)$ is below the lower limit value of the condition (11), the radius of curvature of the object-side surface of the first lens becomes too small, so that the inclination of light incident on the object-side surface of the first lens becomes large to the normal of the object-side surface of the first lens. As a result, the large inclination of light causes an increase of sensitivity of the lenses to decentration. On the other hand, if $(r_1 + r_2)/(r_1 - r_2)$ is beyond the upper limit value of the condition (11), the radius of curvature of the image-side surface of the first lens becomes too large, so that the inclination of light exiting from the image-side surface of the first lens becomes large to the normal of the image-side surface of the first lens. As a result, the large inclination of light causes an increase of sensitivity of the lenses to decentration.

A wide angle optical system according to the present invention is more preferably formed to satisfy the following condition (11)' instead of the condition (11):

$$0.09 < (r_1 + r_2)/(r_1 - r_2) < 0.49 \quad (11)'$$

In this case, the upper limit value of the condition (11)' may be replaced with the upper limit value of the condition (11), or the lower limit value of the condition (11)' may be replaced with the lower limit value of the condition (11).

Besides, in the wide angle optical system according to the present invention, all lenses used for the wide angle optical system are preferably made of resin.

Besides, in the wide angle optical system according to the present invention, a shutter is preferably arranged on the object side of the aperture stop. The shutter may be integrated with the aperture stop or be made as a different part from the aperture stop.

Besides, in the wide angle optical system according to the present invention, the aperture stop is preferably a variable stop.

The first to third embodiments according to the present invention will be explained below referring to the drawings.

In the drawings, subscript numerals in $r_1, r_2, \ldots$ and $d_1, d_2, \ldots$ in sectional views of the optical system correspond to surface numbers, 1, 2, . . . in numerical data, respectively.

Further, in views showing aberration curves, ΔM in views for astigmatism denotes astigmatism in a meridional plane, and ΔS in views for astigmatism denotes astigmatism in a sagittal plane. In this case, the meridional plane is a plane (plane parallel to this document plane) including the optical axis and the chief ray of an optical system. The sagittal plane is a plane (plane perpendicular to this document plane) perpendicular to a plane including the optical axis and the chief ray of an optical system. In addition, FIY denotes an image height.

Further, in the numerical data of the lens in each of the following embodiments, s denotes a surface number of the lens, r denotes the radius of curvature of each surface, d denotes surface interval, nd denotes the refractive index at d line (which has a wave length of 587.5600 nm), vd denotes the Abbe's number to the d line, K denotes a conical coefficient, and $A_4$, $A_6$, $A_8$, and $A_{10}$ denote aspherical surface coefficients, respectively.

In the data for the aspherical surface coefficients in the following numerical data, E denotes a power of ten. For example, "E-01" denotes "ten to the power of minus one". In addition, the shape of each aspherical surface is expressed by the following equation with aspherical surface coefficients in each embodiment:

$$Z=(Y^2/r)/[1+\{1-(1+K)(Y/r)^2\}^{1/2}]A_4Y^4+A_6Y^6+A_8Y^8+A_{10}Y^{10}+\ldots$$

where, Z is taken as a coordinate in the direction along the optical axis, and Y is taken as a coordinate in the direction perpendicular to the optical axis.

Embodiment 1

FIG. 2 is a sectional view showing the formation of an image pickup apparatus provided with a wide angle optical system according to the present embodiment, taken along the optical axis. FIGS. 3A, 3B, 3C, and 3D are views showing a spherical aberration, an astigmatism, a distortion, and a chromatic aberration of magnification respectively, in the wide angle optical system shown in FIG. 2.

First, the formation of an image pickup apparatus provided with a wide angle optical system of the present embodiment is explained using FIG. 2. In the image pick up apparatus provided with the wide angle optical system of the present embodiment, in order from the object side, an aperture stop S, a first lens $L_1$, a second lens $L_2$, a third lens $L_3$, a CCD cover glass CG, and a CCD having an image pickup surface IM are arranged on the optical axis $L_c$. Further, a low pass filter which is given an IR-cut coating, or the like may be arranged between the third lens $L_3$ and the CCD cover glass CG.

The first lens $L_1$ is a biconvex lens both surfaces of which are an aspherical surface. The second lens $L_2$ is a negative meniscus lens both surfaces of which are an aspherical surface, and the convex shape of each of both surfaces of the second lens $L_2$ faces toward the image side of the wide angle optical system. The third lens $L_3$ is a meniscus lens both surfaces of which are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference.

Next, the constitution and numerical data of lenses which constitute each optical system according to the present embodiment are shown.

Numerical value data 1
Unit: millimeter (mm)

Surface data

| s | r | d | nd | vd | effective diameter |
|---|---|---|---|---|---|
| 1 (aperture stop) | ∞ | 0.20 | | | 0.67 |
| 2 (aspherical surface) | 3.315 | 1.15 | 1.53071 | 55.69 | 0.86 |
| 3 (aspherical surface) | −1.512 | 0.42 | | | 1.12 |
| 4 (aspherical surface) | −0.760 | 0.88 | 1.58393 | 30.21 | 1.15 |
| 5 (aspherical surface) | −1.466 | 0.50 | | | 1.38 |
| 6 (aspherical surface) | 2.626 | 1.11 | 1.53071 | 55.69 | 1.94 |
| 7 (aspherical surface) | 2.216 | 0.79 | | | 2.43 |
| 8 | ∞ | 0.30 | 1.51633 | 64.14 | 2.64 |
| 9 | ∞ | 0.30 | | | 2.70 |
| image plane | ∞ | | | | |

Aspherical surface data

The second surface

K = −1.840, A4 = −4.59100E−02, A6 = −3.05100E−02, A8 = −7.12400E−02

The third surface

K = −1.218, A4 = −7.36900E−02, A6 = −2.97600E−02, A8 = 3.09400E−02, A10 = −2.59300E−02

The fourth surface

K = −0.926, A4 = 1.49100E−01, A6 = 1.07400E−01, A8 = −8.17500E−02, A10 = 2.31100E−02

The fifth surface

K = −0.490, A4 = 7.28800E−02, A6 = 5.67100E−02, A8 = −1.36400E−02, A10 = 8.56100E−04

The sixth surface

K = −7.093, A4 = −2.29700E−02, A6 = −6.43000E−04, A8 = 1.18900E−03, A10 = −2.30700E−04

The seventh surface

K = −1.369, A4 = −6.13500E−02, A6 = 9.18900E−03, A8 = −7.47900E−04, A10 = −2.48600E−06

Various data

| Focal length | 3.73 |
| F-number | 2.8 |
| Angle of view | −36.8° |
| Image height | 2.8 |
| The total length of lens | 5.5 |
| Back focus | 1.28 |

Data regarding the above condition in the first embodiment

| Condition (1) ($0.1 < d_5/d_6 < 0.65$) | 0.45 |
| Condition (2) ($-0.04 < f/f_3 < 0.04$) | −0.008 |
| Condition (3) ($0.30 < h_{m7}/h_{P7} < 2.0$) | 0.937 |
| Condition (4) ($0.06 < d_{P7}/f < 0.3$) | 0.074 |
| Condition (5) ($10 < v_2 < 25$) | 30.21 |
| Condition (6) ($0.9 < r_2/r_3 < 4.4$) | 1.99 |
| Condition (7) ($0.3 < |Hr/\Sigma d| < 1.4$) | 0.66 |
| Condition (8) ($-2.0 < Exp/f < -0.45$) | −0.99 |
| Condition (9) ($0.1 < L3d/Fno_{Min} < 0.7$) | 0.36 |
| Condition (10) ($25\% < ILL < 45\%$) | 39.9 |
| Condition (11) ($0.07 < (r_1 + r_2)/(r_1 - r_2) < 0.8$) | 0.37 |

Embodiment 2

Figure 4:
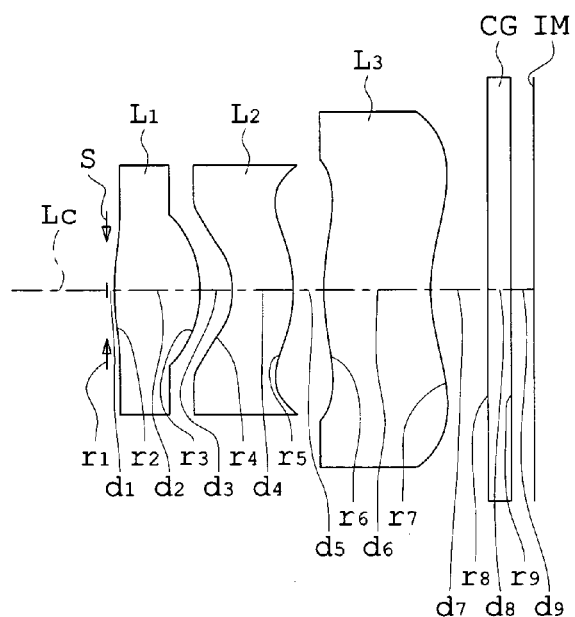
FIG. 4 is a sectional view showing the formations of an image pickup apparatus provided with a wide angle optical system according to the second embodiment, taken along the optical axis.
Figures 5A, 5B, 5C, 5D:
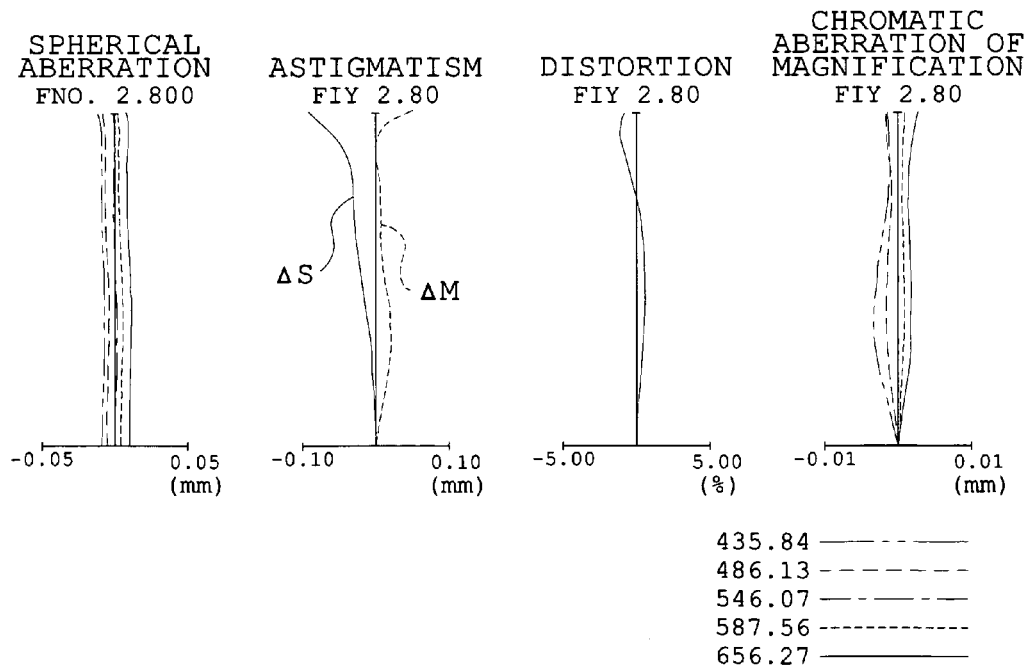
FIGS. 5A, 5B, 5C, and 5D are diagrams showing spherical aberration, astigmatism, distortion, and chromatic aberration of magnification of the wide angle optical system shown in FIG. 4 respectively.

FIG. 4 is a sectional view showing the formation of an image pickup apparatus provided with a wide angle optical system according to the present embodiment, taken along the optical axis. FIGS. 5A, 5B, 5C, and 5D are views showing a spherical aberration, an astigmatism, a distortion, and a chromatic aberration of magnification respectively, in the wide angle optical system shown in FIG. 4.

First, the formation of an image pickup apparatus provided with a wide angle optical system of the present embodiment is explained using FIG. 4. In the image pickup apparatus provided with the wide angle optical system of the present embodiment, in order from the object side, an aperture stop S, a first lens $L_1$, a second lens $L_2$, a third lens $L_3$, a CCD cover glass CG, and a CCD having an image pickup surface IM are arranged on the optical axis $L_c$. Further, a low pass filter which is given an IR-cut coating, or like may be arranged between the third lens $L_3$ and the CCD cover glass CG.

The first lens $L_1$ is a biconvex lens both surfaces of which are an aspherical surface. The second lens $L_2$ is a negative meniscus lens both surfaces of which are an aspherical surface, and the convex shape of each of both surfaces of the second lens $L_2$ faces toward the image side of the wide angle optical system. The third lens $L_3$ is a meniscus lens both surfaces of which are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference.

Next, the constitution and numerical data of lenses which constitute each optical system according to the present embodiment are shown.

Numerical value data 2
Unit: millimeter (mm)

Surface data

| s | r | d | nd | vd | effective diameter |
|---|---|---|----|----|--------------------|
| 1 (aperture stop) | ∞ | 0.10 | | | 0.68 |
| 2 (aspherical surface) | 3.076 | 1.11 | 1.53071 | 55.69 | 0.80 |
| 3 (aspherical surface) | −1.651 | 0.42 | | | 1.05 |
| 4 (aspherical surface) | −0.838 | 0.80 | 1.63259 | 23.27 | 1.10 |
| 5 (aspherical surface) | −1.568 | 0.40 | | | 1.30 |
| 6 (aspherical surface) | 3.271 | 1.39 | 1.53071 | 55.69 | 1.67 |
| 7 (aspherical surface) | 2.771 | 0.74 | | | 2.38 |
| 8 | ∞ | 0.30 | 1.51633 | 64.14 | 2.66 |
| 9 | ∞ | 0.30 | | | 2.72 |
| image plane | ∞ | | | | |

Aspherical surface data

The second surface

K = −1.561, A4 = −4.45188E−02, A6 = −2.78685E−02,
A8 = −4.80497E−02

The third surface

K = −1.110, A4 = −7.35754E−02, A6 = −2.18139E−03,
A8 = 8.64574E−03, A10 = −1.50468E−02

The fourth surface

K = −0.906, A4 = 1.40870E−01, A6 = 1.10717E−01,
A8 = −7.36659E−02, A10 = 1.76769E−02

The fifth surface

K = −0.424, A4 = 6.85954E−02, A6 = 5.20628E−02,
A8 = −1.17039E−02, A10 = 1.12392E−03

The sixth surface

K = −15.009, A4 = −1.96223E−02, A6 = −7.60260E−03,
A8 = 3.02406E−03, A10 = −7.56075E−04

The seventh surface

K = −2.040, A4 = −4.50247E−02, A6 = 6.82918E−03,
A8 = −1.05009E−03, A10 = 3.98509E−05

Numerical value data 2
Unit: millimeter (mm)

Various data

| Focal length | 3.77 |
|---|---|
| F-number | 2.8 |
| Angle of view | −36.8° |
| Image height | 2.8 |
| The total length of lens | 5.5 |
| Back focus | 1.23 |

Data regarding the above condition in the second embodiment

| Condition (1) ($0.1 < d_5/d_6 < 0.65$) | 0.29 |
|---|---|
| Condition (2) ($-0.04 < f/f_3 < 0.04$) | −0.004 |
| Condition (3) ($0.30 < h_{m7}/h_{p7} < 2.0$) | 0.999 |
| Condition (4) ($0.06 < d_{P7}/f < 0.3$) | 0.055 |
| Condition (5) ($10 < v_2 < 25$) | 23.27 |
| Condition (6) ($0.9 < r_2/r_3 < 4.4$) | 1.96 |
| Condition (7) ($0.3 < |Hr/\Sigma d| < 1.4$) | 0.67 |
| Condition (8) ($-2.0 < Exp/f < -0.45$) | −0.90 |
| Condition (9) ($0.1 < L3d/Fno_{Min} < 0.7$) | 0.40 |
| Condition (10) ($25\% < ILL < 45\%$) | 36.2 |
| Condition (11) ($0.07 < (r_1 + r_2)/(r_1 - r_2) < 0.8$) | 0.30 |

Embodiment 3

Figure 6:
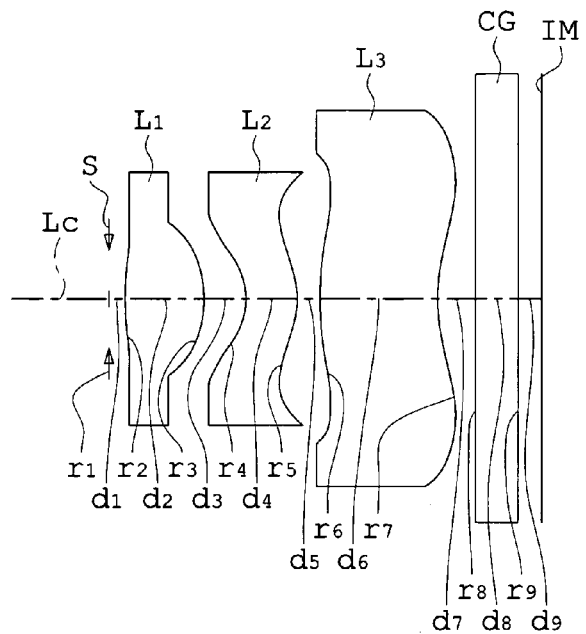
FIG. 6 is a sectional view showing the formations of an image pickup apparatus provided with a wide angle optical system according to the third embodiment, taken along the optical axis.
Figures 7A, 7B, 7C, 7D:
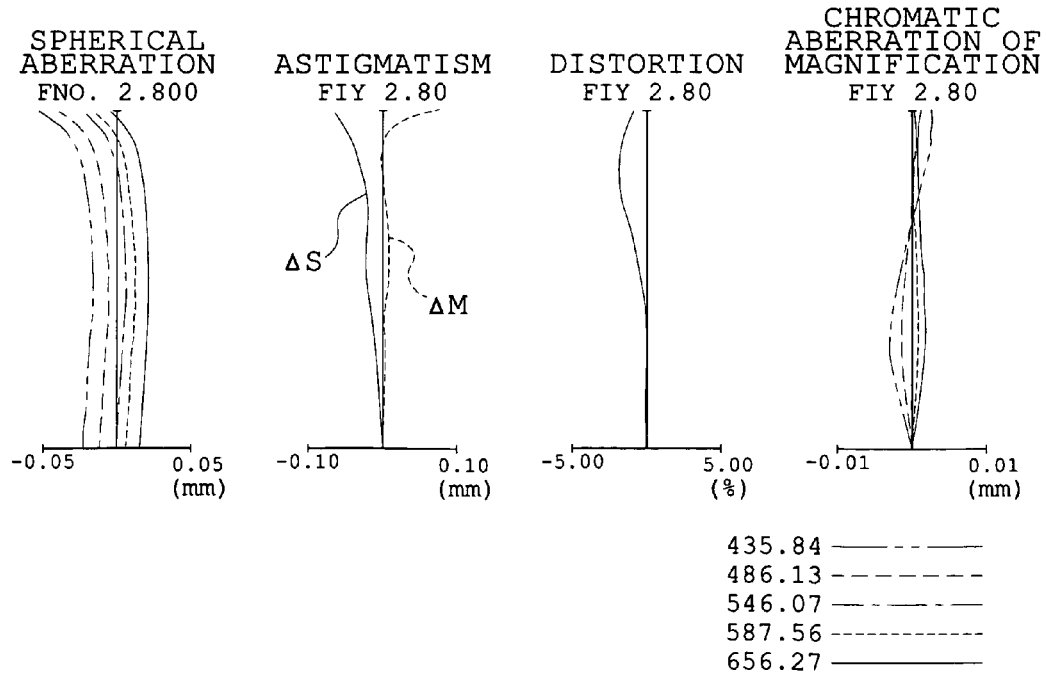
FIGS. 7A, 7B, 7C, and 7D are diagrams showing spherical aberration, astigmatism, distortion, and chromatic aberration of magnification of the wide angle optical system shown in FIG. 6 respectively.

FIG. 6 is a sectional view showing the formation of an image pickup apparatus provided with a wide angle optical system according to the present embodiment, taken along the optical axis. FIGS. 7A, 7B, 7C, and 7D are views showing a spherical aberration, an astigmatism, a distortion, and a chromatic aberration of magnification respectively, in the wide angle optical system shown in FIG. 6.

First, the formation of an image pickup apparatus provided with a wide angle optical system of the present embodiment is explained using FIG. 6. In the image pickup apparatus provided with the wide angle optical system of the present embodiment, in order from the object side, an aperture stop S, a first lens $L_1$, a second lens $L_2$, a third lens $L_3$, a CCD cover glass CG, and a CCD having an image pickup surface IM are arranged on the optical axis $L_c$. Further, a low pass filter which is given an IR-cut coating, or like may be arranged between the third lens $L_3$ and the CCD cover glass CG.

The first lens $L_1$ is a biconvex lens both surfaces of which are an aspherical surface. The second lens $L_2$ is a negative meniscus lens both surfaces of which are an aspherical surface, and the convex shape of each of the both surfaces of the second lens $L_2$ faces toward the image side of the wide angle optical system. The third lens $L_3$ is a meniscus lens both surfaces of which are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference.

Next, the constitution and numerical data of lenses which constitute each optical system according to the present embodiment are shown.

Numerical value data 3
Unit: millimeter (mm)

Surface data

| s | r | d | nd | vd | effective diameter |
|---|---|---|---|---|---|
| 1 (aperture stop) | ∞ | 0.20 | | | 0.67 |
| 2 (aspherical surface) | 3.324 | 1.01 | 1.53071 | 55.69 | 0.85 |
| 3 (aspherical surface) | −1.674 | 0.54 | | | 1.08 |
| 4 (aspherical surface) | −0.757 | 0.66 | 1.63493 | 23.90 | 1.18 |
| 5 (aspherical surface) | −1.327 | 0.30 | | | 1.30 |
| 6 (aspherical surface) | 3.358 | 1.50 | 1.53071 | 55.69 | 1.71 |
| 7 (aspherical surface) | 2.819 | 0.49 | | | 2.41 |
| 8 | ∞ | 0.55 | 1.51633 | 64.14 | 2.59 |
| 9 | ∞ | 0.30 | | | 2.69 |
| image plane | ∞ | | | | |

Aspherical surface data

The second surface $K = -5.092, A4 = -5.50591E-02, A6 = -5.09238E-02,$
$A8 = -7.58536E-02$
The third surface $K = -0.576, A4 = -8.24414E-02, A6 = -4.45512E-02,$
$A8 = 5.35929E-02, A10 = -3.84535E-02$
The fourth surface $K = -1.012, A4 = 1.68277E-01, A6 = 1.10237E-01,$
$A8 = -6.94271E-02, A10 = 1.40257E-02$
The fifth surface $K = -0.990, A4 = 1.04031E-01, A6 = 5.26561E-02,$
$A8 = -1.30418E-02$
The sixth surface $K = -17.986, A4 = 1.55583E-02, A6 = -3.08028E-02,$
$A8 = 1.16072E-02, A10 = -1.74421E-03$
The seventh surface $K = -11.416, A4 = 1.13495E-03, A6 = -9.12222E-03,$
$A8 = 1.80868E-03, A10 = -1.45708E-04$ Various data

| Focal length | 3.71 |
|---|---|
| F-number | 2.8 |
| Angle of view | −37.3° |
| Image height | 2.8 |
| The total length of lens | 5.3 |
| Back focus | 1.15 |

Data regarding the above condition in the third embodiment

| Condition (1) ($0.1 < d_5/d_6 < 0.65$) | 0.20 |
|---|---|
| Condition (2) ($-0.04 < f/f_3 < 0.04$) | −0.004 |
| Condition (3) ($0.30 < h_{m7}/h_{P7} < 2.0$) | 1.059 |
| Condition (4) ($0.06 < d_{P7}/f < 0.3$) | 0.057 |
| Condition (5) ($10 < v_2 < 25$) | 23.9 |
| Condition (6) ($0.9 < r_2/r_3 < 4.4$) | 2.20 |
| Condition (7) ($0.3 < |Hr/\Sigma d| < 1.4$) | 0.68 |
| Condition (8) ($-2.0 < Exp/f < -0.45$) | −0.88 |
| Condition (9) ($0.1 < L3d/Fno_{Min} < 0.7$) | 0.39 |
| Condition (10) ($25\% < ILL < 45\%$) | 35.3 |
| Condition (11) ($0.07 < (r_1 + r_2)/(r_1 - r_2) < 0.8$) | 0.33 |

Now, the above-described image pickup apparatuses using a wide angle optical system according to the present invention can be favorably incorporated into a digital camera, a personal computer, or a cellular phone. Embodiments of a digital camera, a personal computer, and a cellular phone using the image pickup apparatuses are illustrated hereafter.

Figure 8:
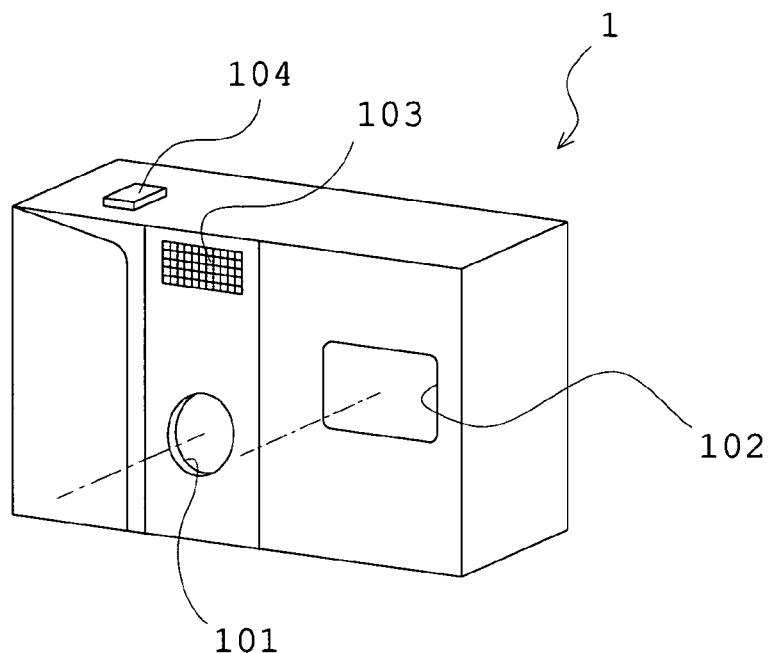
FIG. 8 is a front perspective view showing the appearance of one example of a digital camera into which an image pickup apparatus using a wide angle optical system of the present invention is incorporated.
Figure 9:
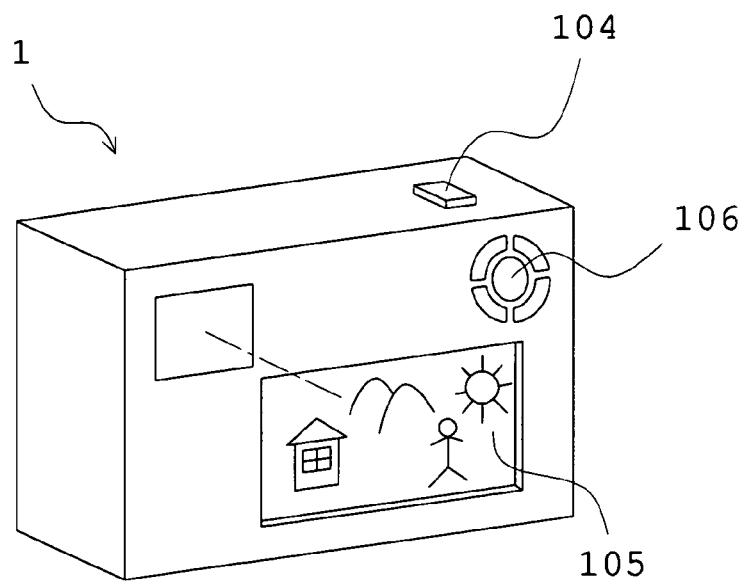
FIG. 9 is a rear perspective view of the digital camera shown in FIG. 8.

First, one example of a digital camera into which an image pickup apparatus using a wide angle optical system according to the present invention is incorporated is shown. FIG. 8 is a front perspective view showing the appearance of a digital camera into which an image pickup apparatus using a wide angle optical system according to the present invention is incorporated. FIG. 9 is a rear perspective view showing the digital camera shown in FIG. 8.

As shown in FIGS. 8 and 9, a digital camera 1 is provided with a photographing opening section 101, a finder opening section 102, and a flash light emitting section 103 in front thereof. Further, on the upper face of the camera, a shutter button 104 is provided. Further, on the back face of the camera, a liquid crystal display monitor 105, an information input section 106, and a finder eyepiece section 107 are provided. In addition, within the camera, an image pickup apparatus using a wide angle optical system according to the present invention, a processing means, and a recording means are provided.

The digital camera 1 having such formation is formed in such a way that image information is acquired through the image pickup apparatus by pressing the shutter button 104 which is provided on the top thereof. The acquired image information is recorded by the recording means which is provided inside the digital camera 1. In addition, the image information recorded by the recording means is taken out from the recording means by the processing means, and the image information can be also displayed as an electronic image on the liquid crystal display monitor 105 which is provided on the rear of the camera.

Figure 10:
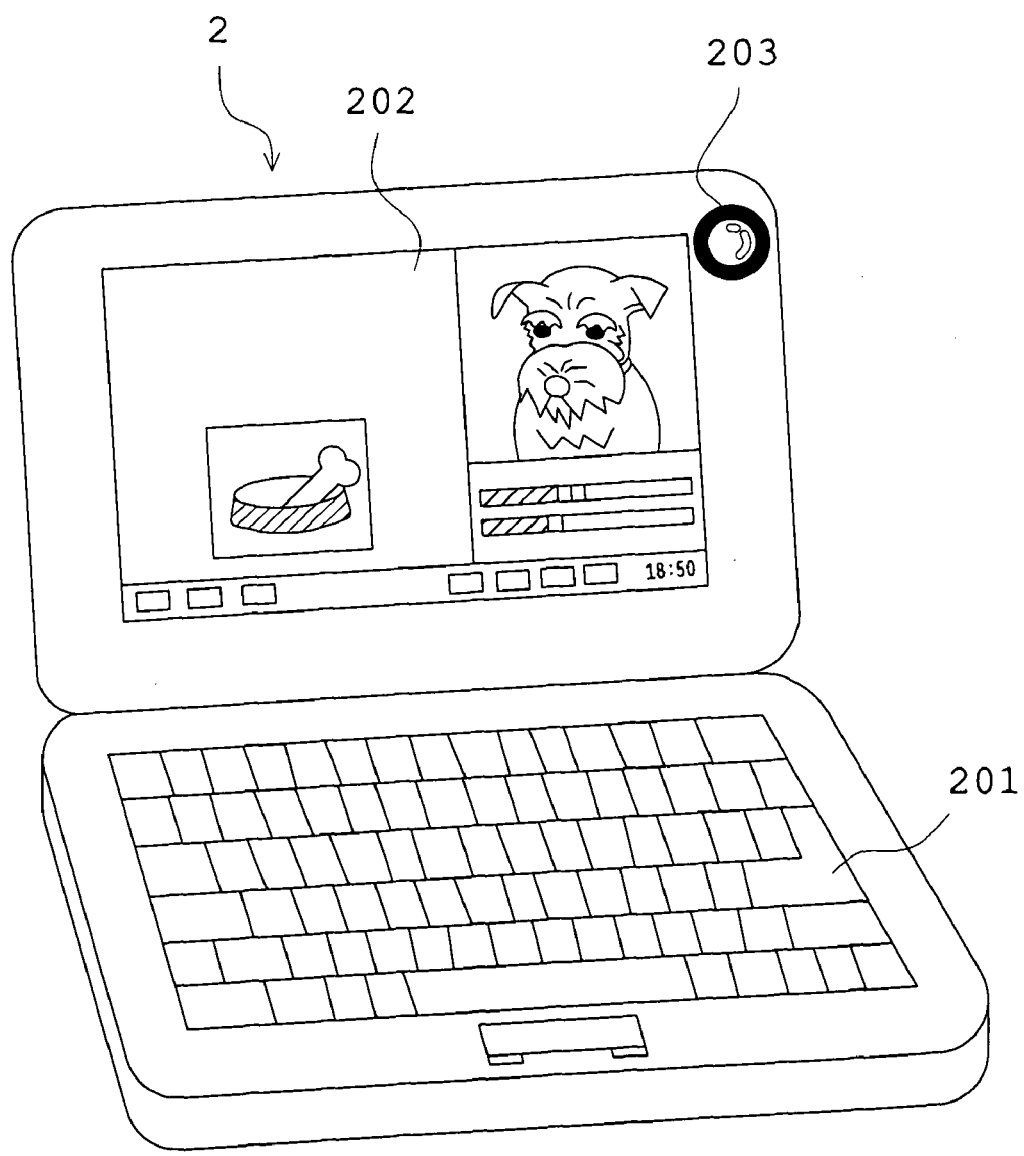
FIG. 10 is a front perspective view of one example of a personal computer the cover of which is opened and into which an image pickup apparatus using a wide angle optical system of the present invention is incorporated.
Figure 11:
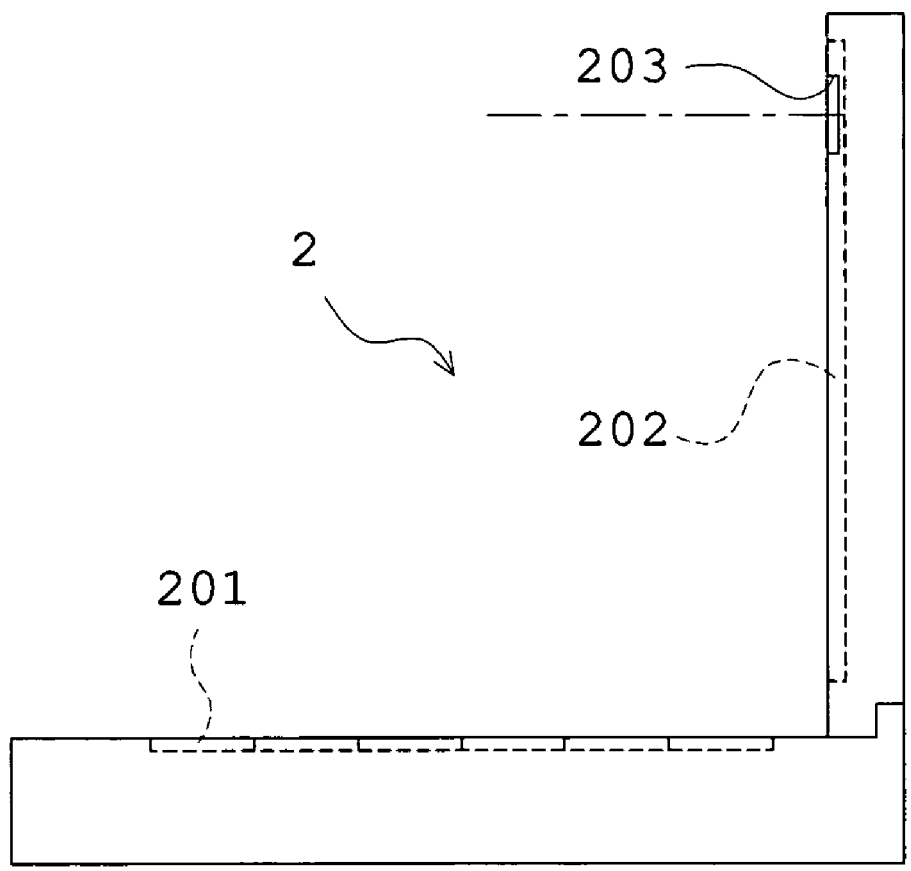
FIG. 11 is a side view of the personal computer shown in FIG. 10.

Next, one example of a personal computer which is an information processing apparatus into which an image pickup apparatus using a wide angle optical system according to the present invention is incorporated is shown. FIG. 10 is a front perspective view showing a personal computer the cover of which is opened and into which an image pickup apparatus using a wide angle optical system according to the present invention is incorporated. FIG. 11 is a side view of the same.

As shown in FIGS. 10 and 11, a personal computer 2 is provided with: a keyboard 201 for a user to input information from the outside; and a liquid crystal display monitor 202 by which the user observes an image. And, a photographing opening section 203 is formed on the side of the liquid crystal display monitor 202. In addition, the personal computer is provided with an image pickup apparatus using a wide angle optical system according to the present invention for photographing an image of the user or its surroundings, a processing means, and a recording means inside the personal computer.

Further, the image information acquired by the image pickup apparatus is recorded by the recording means. The image information recorded by the recording means is taken out from the recording means by the processing means, and the image information can be displayed as an electronic image on the liquid crystal display monitor 202. It is also possible to display the electronic image on a personal computer of a communication partner by the processing means through the Internet or a telephone circuit.

In this example, the image pickup apparatus is arranged on the side of the liquid crystal display monitor 202. However, an arranged position of the image pickup apparatus is not limited to the above-described position, and the image pickup apparatus may be arranged at any position, for example, at a position except the position on the side of the liquid crystal display monitor 202, such as a position over or under the liquid crystal display monitor 202, or at a position on the periphery of the keyboard 201.

In this example, a transmissive liquid crystal display element is used as the liquid crystal display monitor 202, where the transmissive liquid crystal display element is illuminated from its back by a backlight which is not shown in the drawings. However, a CRT display may be used as a display means in this example.

Figure 12A:
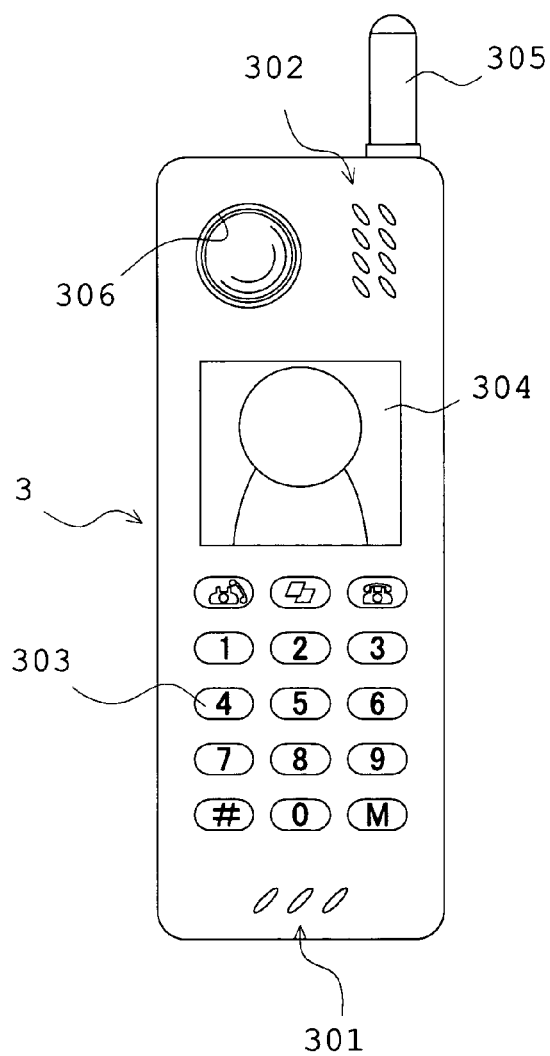
FIGS. 12A and 12B are a front view and a side view of one example of a cellular phone into which an image pickup apparatus using a wide angle optical system of the present invention is incorporated, respectively.

Next, one example of a cellular phone which is an information processing apparatus into which an image pickup apparatus using a wide angle optical system according to the present invention is incorporated is shown. FIG. 12A is an elevation showing one example of a cellular phone into which an image pickup apparatus using a wide angle optical system according to the present invention is incorporated, and FIG. 12B is a side view showing the cellular phone.

Figure 12B:
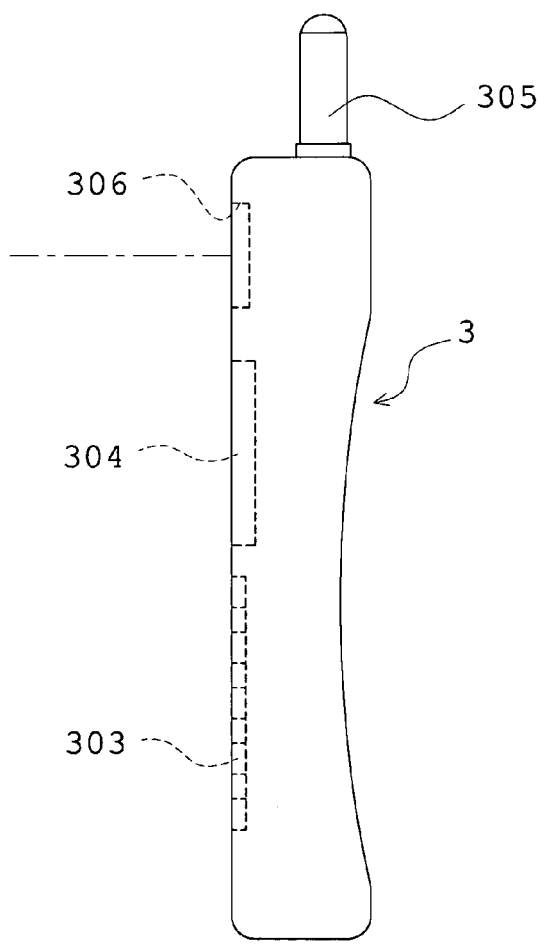

As shown in FIGS. 12A and 12B, a cellular phone 3 is provided with a microphone section 301 by which a user's voice is inputted as information, a speaker section 302 which outputs a voice of a user's partner, input keys 303 by which a user inputs information, a liquid crystal display monitor 304 which displays information including a photographic image or the telephone number of a user or his partner, and an antenna 305 by which a radio wave for communication is sent and received. And, a photographing opening section 306 is formed on the side of the speaker section 302. In addition, the cellular phone 3 is provided with an image pickup apparatus using a wide angle optical system according to the present invention for photographing an image of a user or its surroundings, a processing means, and a recording means inside the cellular phone. Further, a liquid crystal display element is used as the liquid crystal display monitor 304. In the drawings, the arranged position of each of the components is not limited to the illustrated position of each of the components, and each of the components of the cellular phone 3 may be arranged suitably.

Further, the image information acquired by the image pickup apparatus is recorded by the recording means. And, the image information recorded by the recording means is taken out from the recording means by the processing means, and the image information is displayed as an electronic image on the liquid crystal display monitor 304. In addition, the processing means has a signal-processing function by which information of an image to be sent to a communication partner is transformed into transmittable signals.

What is claimed is:

1. A wide angle optical system comprising, in order from the object side, an aperture stop, a first lens with positive refracting power, a second lens with negative refracting power, and a third lens,
   wherein both surfaces of the third lens are an aspherical surface in which refracting power varies in accordance with distance from the optical axis in such a way that the both surfaces have a convex shape facing toward the object side in the vicinity of the optical axis and have a concave shape facing toward the object side in the vicinity of the outer circumference,
and the following conditions (1) and (2) are satisfied:

$$0.1 < d_5/d_6 < 0.65 \tag{1}$$

$$-0.04 < f/f_3 < 0.04 \tag{2}$$

where $d_5$ is a space distance between the second and third lenses on the optical axis, $d_6$ is the thickness of the third lens on the optical axis, f is a focal length of the whole of the wide angle optical system, and $f_3$ is a focal length of the third lens.

2. A wide angle optical system according to claim 1, wherein the following condition (3) is satisfied:

$$0.30 < h_{m7}/h_{P7} < 2.0 \tag{3}$$

where $h_{m7}$ is the shortest distance between the optical axis and a point on the image-side surface of the third lens through which a light ray passing through the center of the aperture stop at an angle of 36 degrees to the optical axis to be used for an image formation passes, and $h_{P7}$ is the shortest distance between the optical axis and the most image-side point on the image-side surface of the third lens.

3. A wide angle optical system according to claim 1 or 2, wherein the following condition (4) is satisfied: $0.6 < dp7/f < 0.3$
   where dP7 is the distance between: an intersection of the image-side surface of the third lens and the optical axis; and an intersection of the optical axis
   and a perpendicular drawn from the most image-side point on the image-side surface of the third lens to the optical axis, wherein the most image-side point on the image-side surface of the third lens is not on the optical axis.

4. A wide angle optical system according to claim 1 or 2, wherein the following condition (5) is satisfied:

$$10 < \nu_2 < 25 \tag{5}$$

where $\nu_2$ is the Abbe's number of the second lens.

5. A wide angle optical system according to claim 3, wherein the following condition (6) is satisfied:

$$0.9 < r_2/r_3 < 4.4 \tag{6}$$

where $r_2$ is the radius of curvature of the image-side surface of the first lens, and $r_3$ is the radius of curvature of the object-side surface of the second lens.

6. A wide angle optical system according to claim 1 or 2, wherein the following condition (7) is satisfied:

$$0.3 < |Hr/\Sigma d| < 1.4 \tag{7}$$

where Hr is the distance from an image formation position to a rear principal point of the whole of the wide angle optical system, and $\Sigma d$ is the total length of the whole of the wide angle optical system.

7. A wide angle optical system according to claim 1 or 2, wherein the following condition (8) is satisfied:

$$-2.0 < Exp/f < -0.45 \tag{8}$$

where Exp is the distance from an image formation position to an exit pupil position.

8. A wide angle optical system according to claim 1 or 2, wherein the following condition (9) is satisfied:

$$0.1 < L3d/Fno_{Min} < 0.7 \tag{9}$$

where L3d is the distance from the object-side surface of the third lens to an image formation position and the millimeter (mm) is used as the unit of L3d, and $Fno_{Min}$ is the minimum F-number.

9. A wide angle optical system according to claim 3, wherein the following condition (9) is satisfied:

$$0.1 < L3d/Fno_{Min} < 0.7 \tag{9}$$

where L3d is the distance from the object-side surface of the third lens to an image formation position and the millimeter (mm) is used as the unit of L3d, and $Fno_{Min}$ is the minimum F-number.

10. A wide angle optical system according to claim 1 or 2, wherein the following condition (10) is satisfied:

$$25\% < ILL < 45\% \tag{10}$$

where ILL is a ratio of quantity of light of off-axis light flux to quantity of light of on-axis light flux at an image formation position.

11. A wide angle optical system according to claim 1 or 2, wherein the following condition (11) is satisfied:

$$0.07 < (r_1 + r_2)/(r_1 - r_2) < 0.8 \tag{11}$$

where $r_1$ is the radius of curvature of the object-side surface of the first lens, and $r_2$ is the radius of curvature of the image-side surface of the first lens.

12. A wide angle optical system according to claim 5, wherein the following condition (11) is satisfied:

$$0.07 < (r_1 + r_2)/(r_1 - r_2) < 0.8 \tag{11}$$

where $r_1$ is the radius of curvature of the object-side surface of the first lens, and $r_2$ is the radius of curvature of the image-side surface of the first lens.

13. An image pickup apparatus comprising:
a wide angle optical system according to claim 1 or 2, and
an image pickup element which is arranged on the image side of the wide angle optical system and transforms an optical image into electrical signals.

* * * * *